US008462638B2

(12) United States Patent
Gandhi et al.

(10) Patent No.: US 8,462,638 B2
(45) Date of Patent: Jun. 11, 2013

(54) SOFT PREEMPTION FOR MINIMIZING PREEMPTIONS IN A NETWORK

(75) Inventors: Rakesh Gandhi, Stittsville (CA); Robert Sawaya, Ottawa (CA); Tarek Saad, Ottawa (CA); Junaid Israr, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 13/077,352

(22) Filed: Mar. 31, 2011

(65) Prior Publication Data

US 2012/0250696 A1 Oct. 4, 2012

(51) Int. Cl.
*G01R 31/08* (2006.01)
(52) U.S. Cl.
USPC .................... 370/237; 370/395.5; 370/401
(58) Field of Classification Search
None
See application file for complete search history.

(56) References Cited

U.S. PATENT DOCUMENTS

| | | | | |
|---|---|---|---|---|
| 6,956,821 | B2 * | 10/2005 | Szviatovszki et al. | 370/237 |
| 7,359,386 | B2 * | 4/2008 | Vasseur et al. | 370/395.5 |
| 7,688,732 | B2 * | 3/2010 | Manzalini et al. | 370/235 |
| 2012/0082034 | A1 * | 4/2012 | Vasseur | 370/235 |
| 2012/0147895 | A1 * | 6/2012 | Choudhury et al. | 370/401 |
| 2012/0250696 | A1 * | 10/2012 | Gandhi et al. | 370/400 |

OTHER PUBLICATIONS

Calhioun, P. et al., "Lightweight Access Point Protocol", Request for Comments 5412, dated Feb. 2010, 117 pages.
Awduche, L. Et, "RSVP-TE: Extensions to RSVP for LSP Tunnels", Request for Comments 3209, dated Dec. 2001, 61 pages.
Berger, L. et al., "Generalized Multi-Protocol Label Switching (GMPLS) Signaling Resource Reservation Protocol-Traffic Engineering (RSVP-TE) Extension", Request for Comments 3473, dated Jan. 2001, 42 pages.
Braden, R. et al., "Resource Reservation Protocol (RSVP)—Version 1 Functional Specification", Request for Comments 2205, dated Sep. 1997, 105 pages.

* cited by examiner

*Primary Examiner* — Robert Wilson
(74) *Attorney, Agent, or Firm* — Hickman Palermo Truong Becker Bingham Wong LLP (57) ABSTRACT

In an embodiment, a method is disclosed for minimizing soft preemptions of LSPs. Upon receiving a reservation message for an LSP whose requested bandwidth that exceeds the available bandwidth of downstream links, a network node may select a set of LSPs for soft preemption and share the selection with other nodes along their paths, both upstream and downstream. By coordinating the selection of LSPs to soft-preempt among nodes on the path, fewer LSPs may require soft preemption, which may result in minimizing excessive network disruptions, and thus, allowing the network to function more efficiently.

21 Claims, 9 Drawing Sheets

SOFT PREEMPTION FOR MINIMIZING PREEMPTIONS IN A NETWORK

TECHNICAL FIELD

The present disclosure generally relates to RSVP based Traffic Engineering (TE) in a network. The disclosure relates more specifically to addressing multiple preemptions of bandwidth reservations in an MPLS TE network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In packet-switched networks consisting of multiple network elements such as routers and switches, the Resource Reservation Protocol ("RSVP") may be used to reserve routing paths for the purpose of providing optimized routing of specified kinds of network traffic, such as voice traffic. RSVP is described in Braden et al., "Resource ReSerVation Protocol (RSVP)—Version 1, Functional Specification," Request for Comments (RFC) 2205 of the Internet Engineering Task Force (IETF), September 1997.

MPLS (Multi-Protocol Label Switching) Traffic Engineering has been developed to meet data networking requirements such as guaranteed available bandwidth. MPLS Traffic Engineering exploits modern label switching techniques to build guaranteed bandwidth end-to-end circuits through an IP network of label switched routers (LSRs). These circuits are a type of label switched path (LSP) and thus generally referred to as MPLS Traffic Engineering LSPs. MPLS Traffic Engineering LSPs traverse a series of nodes and links that interconnect them. MPLS Traffic Engineering protocols define a link to be a logical construct that represents physical resources that interconnect label switched routers. The information about a particular link including the available link bandwidth is used in determining the routes of LSPs and signaling their establishment. Admission control is performed to ensure that link capacity is not exceeded during setting up of an LSP. Extensions to RSVP for MPLS Traffic Engineering are described in RFC 3209 and RFC 3473 full citations of which are: "Extensions to RSVP for LSP Tunnels", D. Awduche, et al, RFC 3209, December 2001; "Generalized Multi-Protocol Label Switching (GMPLS) Signaling Resource ReserVation Protocol-Traffic Engineering (RSVP-TE) Extensions", RFC 3473, L. Berger, et al, January 2003.

MPLS TE preemption consists of freeing the resources of an already established LSP and assigning them to a new LSP. The freeing of these resources causes a traffic disruption to the LSP that is being preempted. Soft preemption is an extension to the RSVP TE protocol to minimize and even eliminate (in case no drops happen due to congestion) the traffic disruption over the preempted LSP. RFC 5712, "MPLS Traffic Engineering Soft Preemption", M. Meyer, et al, January 2010 describes soft preemption in an MPLS network. Today since decision to compute the set of candidate LSPs for soft preemption is local to a node in the network, setting up of a high priority LSP can result in an excessive number of LSPs being preempted leading to a major network disruption.

Throughout this document, familiarity with all the foregoing references is assumed. In one respect, these extensions enable RSVP to interoperate with processes that implement Multi-Protocol Label Switching (MPLS).

DETAILED DESCRIPTION

Techniques for soft preemption for minimizing the number of preemptions in an MPLS network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Notifying nodes on a preempted path of preempted bandwidth
   3.1 First example—one path preempted
   3.2 Performing soft preemption locally at a node
   3.3 Second example—efficiency of soft preemption in progress.
   3.4 Responding to a path error message
   3.5 Responding to a path change message
4.0 Implementation Mechanisms—Hardware Overview
5.0 Extensions and Alternatives
1.0 General Overview Techniques for soft preemption for minimizing the number of preemptions in an MPLS network are described. In an embodiment, a method comprises receiving, at a first network node, a resource reservation message specifying a first label switched path (LSP), a first priority value, and a first minimum required bandwidth value associated with the first LSP; determining, at the first network node, that a sum of the first minimum required bandwidth value and a second minimum required bandwidth associated with a previously received, second LSP exceeds an available bandwidth of a first link of the first network node to a second network node; determining whether the first priority value indicates that the first LSP has a higher priority than the second LSP; in response to determining that the first LSP has a higher priority than the second LSP, marking the second LSP as being soft-preempted and refraining from reserving bandwidth for the second LSP on the first link; and sending an error message to a third network node specifying that the second LSP is being soft-preempted at the first link of the first node. The third network node is upstream of the first network node and the second network node, and the third network node is not an origin of the second LSP.

In an embodiment, the method further comprises the third network node marking the second LSP as preempted.

In an embodiment, the method further comprises sending a message to a fourth network node specifying that the second LSP is preempted. The fourth network node is downstream of the first network node and the second network node.

In an embodiment, the method further comprises the fourth network node marking the second LSP as preempted.

In an embodiment, the method further comprises in response to receiving at the fourth network node, the resource reservation message specifying a fourth LSP, a fourth priority value, and a fourth minimum required bandwidth value associated with the fourth LSP, determining whether any LSP, of a set of LSP's for which traffic is carried over the fourth link, must be preempted; in response to determining that at least one LSP that is carried over the second link must be soft-preempted, selecting a fifth LSP for soft preemption; the fifth LSP is either the second LSP or another LSP that is already marked for soft preemption; sending an error message to a second network node specifying that the fifth LSP is soft-preempted; and the second network node is upstream of the fourth network node.

In an embodiment, the message to the fourth network node is an RSVP new path change message.

In an embodiment, the method further comprises determining whether any LSP, of one or more LSP's previously assigned to the first link, must be preempted by determining that a sum of the first minimum required bandwidth value and each minimum required bandwidth value associated with each LSP of the one or more LSP's previously assigned to the first link exceeds the available bandwidth of the first link of the first network node to the second network node.

In an embodiment, determining whether an LSP, of the one or more LSP's previously assigned to the first link, must be preempted comprises determining that the first LSP has higher priority than at least one of the LSP's.

In an embodiment, the first LSP has higher priority than the second LSP when the first priority value is less than a second priority value associated with the second LSP, and the first LSP has lower priority than the second LSP when the first priority value is greater than the second priority value.

In an embodiment, the method further comprises the third network node receiving the error message specifying that the second LSP is soft-preempted. The third network node sends traffic for the second LSP over a second link and marks the second LSP as being soft-preempted by a downstream node. The method further comprises, in response to receiving at the third network node, the resource reservation message specifying a first label switched path (LSP), the first priority value, and the first minimum required bandwidth value associated with the first LSP, determining whether any LSP, of a set of LSP's for which traffic is carried over the second link, must be preempted; the third network node forwarding the path error message upstream; and in response to determining that at least one LSP that is carried over the second link must be preempted, selecting a third LSP for soft preemption. The third LSP is one of the second LSP or another LSP that is already marked for soft preemption. The method further comprises sending, an error message specifying that the third LSP is soft-preempted, to a fifth network node that is upstream of the third network node.

In an embodiment, each of the messages conforms to resource reservation protocol (RSVP).

Other embodiments may encompass a computer apparatus and a non-transitory computer-readable storage medium configured to carry out the foregoing steps.

2.0 Structural and Functional Overview

In an embodiment, the techniques herein are applied in the context of MPLS traffic engineering in connection with the use of RSVP. RSVP operation may be controlled using Path messages and Resv (reservation) messages. In general, in RSVP operation a sender issues a Path message; a receiver receives the message, which identifies the sender. As a result, the receiver acquires reverse path information and may start sending Resv messages to reserve resources at intermediate hosts. The Resv messages propagate through the internet and arrive at the sender. The sender then starts sending data packets and the receiver receives the packets. The sender and received may be packet-switched routers or other elements of network infrastructure.

MPLS provides a way to establish expedited routing paths (may also be referred to as "tunnels" herein) in networks. A management station can instruct a router that all packets bearing a specified label and arriving on a particular ingress port should be immediately routed to a particular egress port with a specified egress label applied to the packet upon egress. In this way, labeled packets bypass normal route processing decisions and move more rapidly through the network. Such expedited treatment is beneficial for network traffic that is sensitive to routing delays or latency, such as voice traffic.

Typically, a software process implements RSVP in a router or switch. The RSVP flow specification for a reserved path through the network includes a required minimum bandwidth. Each link in the reserved path must reserve at least the required minimum bandwidth for the path. In addition, the flow specification indicates a priority for the path. When a node receives a reservation message requesting a reservation for a new path, the node determines whether the node has an available downstream link with sufficient capacity to guarantee the required minimum bandwidth in addition to the bandwidth that is already reserved on the link. If there is no link with sufficient capacity, the priority of newly requested path is compared to the priorities of the paths currently allocated to the downstream links. If the newly requested path has a higher priority than a currently serviced path, the lower priority path is subject to preemption.

One approach is to identify a set of lower priority paths whose collective bandwidth, when freed, is at least as great as the required minimum bandwidth for the new path. These identified paths may be hard preempted, meaning that the paths are abruptly de-allocated from service on the link, and traffic along these paths is no longer delivered on that link.

Soft preemption may allow a "make before break" technique for reclaiming bandwidth on a link. Soft preemption may involve temporarily reserving more than the capacity of the link. The bandwidth for the new reservation is allocated before the preempted bandwidth is de-allocated. At a time when the network is not heavily loaded, traffic on a soft-preempted path may continue to be delivered while the system determines a new route for the preempted path.

Figure 1:
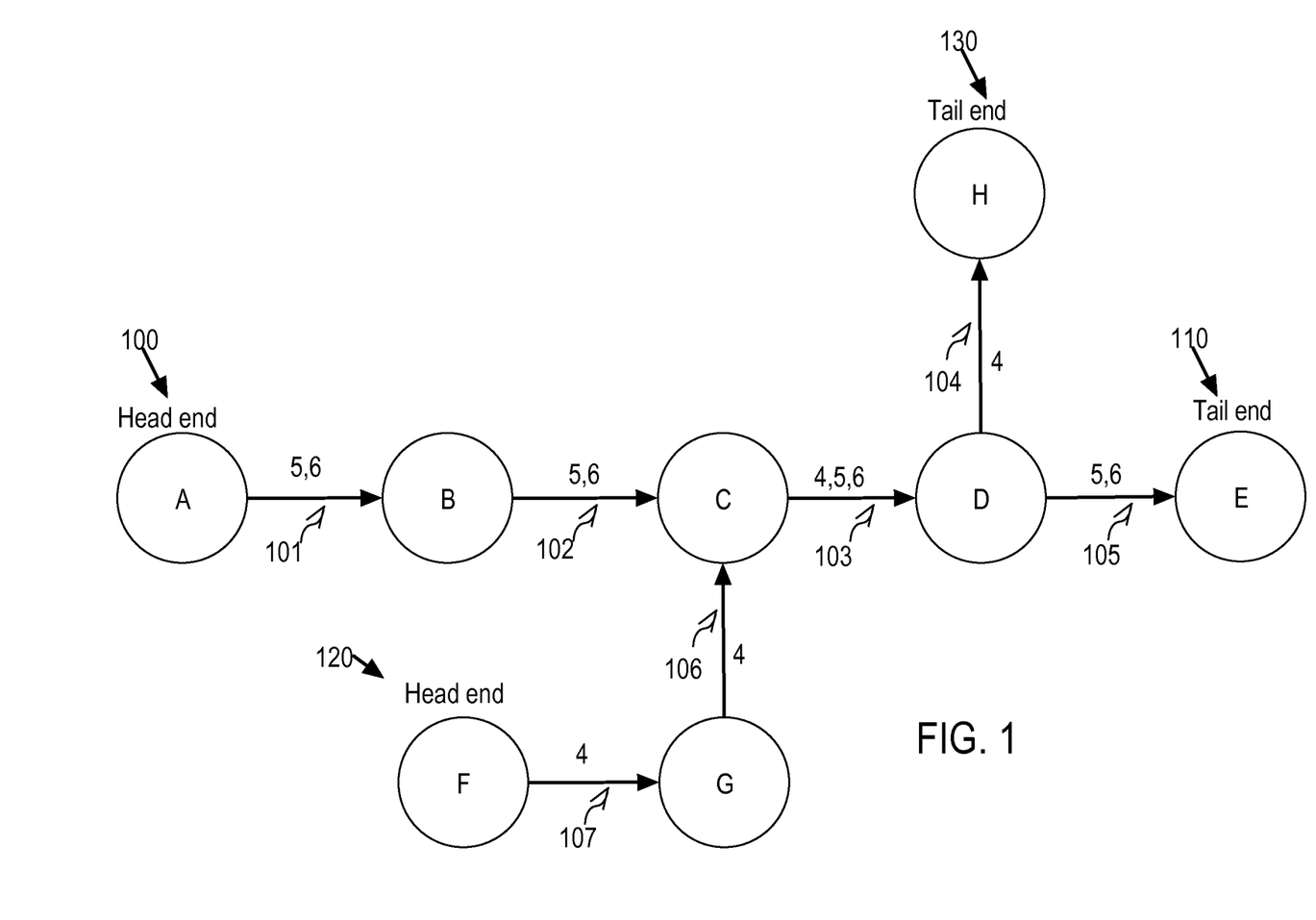
FIG. 1 illustrates an example network of nodes with three reserved paths.

FIG. 1 illustrates an example network of nodes with three reserved paths. To illustrate reserved bandwidth in a network, FIG. 1 shows a network of nodes A through G with Links 101 through 107 over which data may directly flow in the direction of the arrows from one node to another. For example, Node A can send traffic to Node B over Link 101, but Node A cannot send traffic directly to Node F because there is no link between Node A and Node F. Data flows from a head end node, such as Node A and Node F to a tail end node, such as Node H and Node E. A path from one node to another is the sequence of nodes and links over which data travels from head end to tail end.

For purposes of illustrating a clear example, FIG. 1 shows only the eight (8) nodes labeled A through H with specified links. In a practical embodiment, there may be any number of nodes and links according to any topology. Each of the nodes A through H may comprise a router, switch, or other computing device. For example, any or all of the nodes A through H may comprise a computing device of the type shown in FIG. 2 or in FIG. 5, as further described.

In FIG. 1, numbers shown next to the links indicate the minimum bandwidth reserved for each of the paths for which the link carries traffic. The numbers represent hypothetical example reserved bandwidth values that could have been established through operation of RSVP at a hypothetical previous time. For example, there are two paths in the diagram with the following sequence of nodes and links: {Node A, Link 101, Node B, Link 102, Node C, Link 103, Node D, Link 105, Node E} where Node A is at a head end 100 and Node E is at a tail end 110. One of the paths with this sequence has a reserved minimum bandwidth of 5 units per time and the other has a reserved minimum bandwidth of 6 units per time.

A third path shown in the diagram has the sequence {Node F, Link 107, Node G, Link 106, Node C, Link 103, Node D, Link 104, Node H} where Node F is at a head end 120 and Node H is at a tail end 130. The minimum bandwidth allocated to the path is 4 units per time. Link 103 carries traffic for all paths shown in the diagram.

For purposes of illustrating a clear example, FIG. 1 illustrates a limited number of reserved bandwidth values having hypothetical unit values. In a practical embodiment, any number of values may be provided and any useful unit values may be used.

Figure 2:
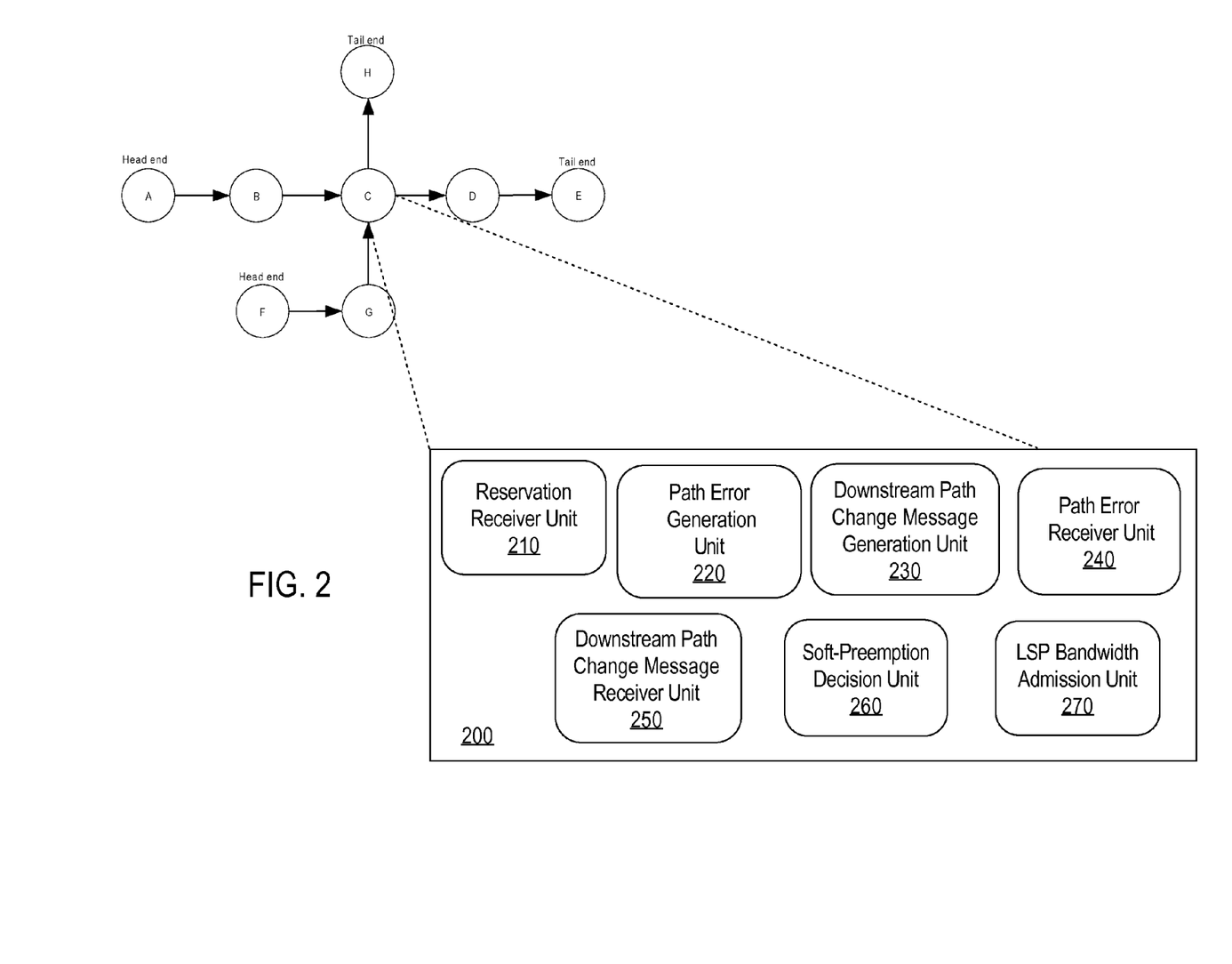
FIG. 2 illustrates functional units of an example network node.

FIG. 2 illustrates functional units of an example network node. Node C, for example, comprises a plurality of data processing components 200 which may comprise a Reservation Receiver Unit 210, a Path Error Generation Unit 220, Downstream Path Change Message Generation Unit 230, a Path Error Receiver Unit 240, a Downstream Path Change Message Receiver Unit 250, a Soft preemption Decision Unit 260, and a LSP Bandwidth Admission Unit 270.

In general, the generation units 220, 230 create messages to send to other nodes and the receiver units 210, 240, 250 process (handle) messages received from other nodes.

In various embodiments, components 200 comprise one or more computer programs, other software elements, firmware, ASICs, FPGAs, other hardware elements, or a combination thereof. Thus, network node may comprise a special-purpose computer configured as described herein to provide the particular functions that are described herein.

In an embodiment, components 200 may be configured as follows.

Reservation Receiver Unit 210: In an embodiment, Reservation Receiver Unit 210 receives a path reservation message from a downstream node, such as an RSVP Resv message, for allocating a new path through the network with at least the specified minimum bandwidth. The Reservation Receiver Unit 210 attempts to allocate the required minimum bandwidth on one of its downstream links. Downstream links carry traffic towards the tail end node of a path. The Reservation Receiver Unit 210 determines whether any of the candidate links have the capacity to carry the minimum bandwidth required for the new path in addition to the other bandwidth already reserved on the link. If any candidate link has available capacity to reserve the minimum bandwidth for the new path, then that link is selected for the new path, and no preemption is necessary.

Path Error Generation Unit 220: In an embodiment, when a node selects a path for soft-preemption, Path Error Generation Unit 220 generates a message that notifies all upstream nodes on the preempted path that the path is soft-preempted. In an embodiment, the message is only directly sent to the nearest upstream node and forwarded upstream one hop at a time until the error message reaches the head end.

In an embodiment, Path Error Generation Unit 220 is configured to cause sharing the information regarding which paths have already been soft-preempted by one node with all other upstream nodes along the same preempted path.

In an embodiment, forwarding the path reservation message to upstream nodes is delayed until after the path error message is sent. The delay gives upstream nodes a chance to mark the preempted path as soft-preempted, and to use that information in their own reservation decision.

Downstream Path Change Message Generation Unit 230: In an embodiment, Downstream Path Change Message Generation Unit 230 generates a message to notify one or more downstream nodes on a soft-preempted path that the path has been soft-preempted. In an embodiment, the message is only directly sent to the nearest downstream node and forwarded downstream one hop at a time until the message reaches the tail end.

Path Error Receiver Unit 240: In an embodiment, Path Error Receiver Unit 240 receives the path error messages sent upstream by a node that has soft-preempted a path. In response to receiving the path error message, a node that is a receiver of the path error message (path error receiver) marks that the path is in the process of being soft-preempted, but the path error receiver continues to send data on the link associated with the preempted path until the path error receiver makes an independent determination to soft-preempt the path on the downstream link. The path error receiver then forwards the path error message to the next upstream node on the path.

Downstream Path Change Message Receiver Unit 250: In an embodiment, the Downstream Path Change Message Receiver Unit 250 receives a path change message sent from an upstream node to a downstream node that indicates that a path between the upstream node and the node receiving the path change message (path change receiver) has been soft-preempted. The path change receiver marks the path as in a soft preemption-in-progress state, but may continue to receive data on that path and to send the data out on its outgoing link. The path change receiver then forwards the path change message to the next node downstream along the preempted path.

Soft preemption Decision Unit 260: When a node (1) receives a reservation message requesting to reserve bandwidth for a new path, (2) the minimum required bandwidth is more than the available capacity of any link leading downstream from the node, and (3) the priority of the new path is higher than one or more paths already reserved on a downstream link from the node, in an embodiment, the Soft preemption Decision Unit 260 selects an LSP for soft preemption in order to free up bandwidth on a link. The Soft preemption Decision Unit 260 first identifies LSPs that are already in a soft preemption in progress state, and marks these identified LSPs locally within the node as soft-preempted. If preempting LSPs that are already in progress of being preempted does not free enough bandwidth to accommodate the new, higher priority path, then other LSPs may be selected for soft preemption. Only when there are no LSPs currently in a soft preemption-in-progress state known to the node are other paths considered for soft preemption.

If there are multiple paths with bandwidth reserved on the link, there may be several different ways to determine which path or paths to select for soft preemption. In an embodiment, certain paths marked as having been soft-preempted already by another node on the path are selected before other paths that have not been so marked. Selecting one or more paths for soft preemption may be performed using the techniques of the above-identified RFCs, for example, or other techniques; the particular method of selecting paths for soft preemption is not critical.

LSP Bandwidth Admission Unit 270: In an embodiment, the LSP Bandwidth Admission Unit 270 reserves bandwidth on a link leading downstream from a node. When an LSP is selected for soft preemption locally within a node, that LSP is re-admitted with a bandwidth of zero on the downstream link.

In an embodiment, one or more of the components 200 may be integrated into an operating system, control system or other logic or software element of an internetworking element. For example, in one embodiment, logic configured to implement the functions described herein is integrated into IOS-XR Software, commercially available from Cisco Systems, Inc., San Jose, Calif. In an embodiment, the logic forms part of an MPLS Traffic Engineering module of the operating system, control system or other logic.

Figure 3:
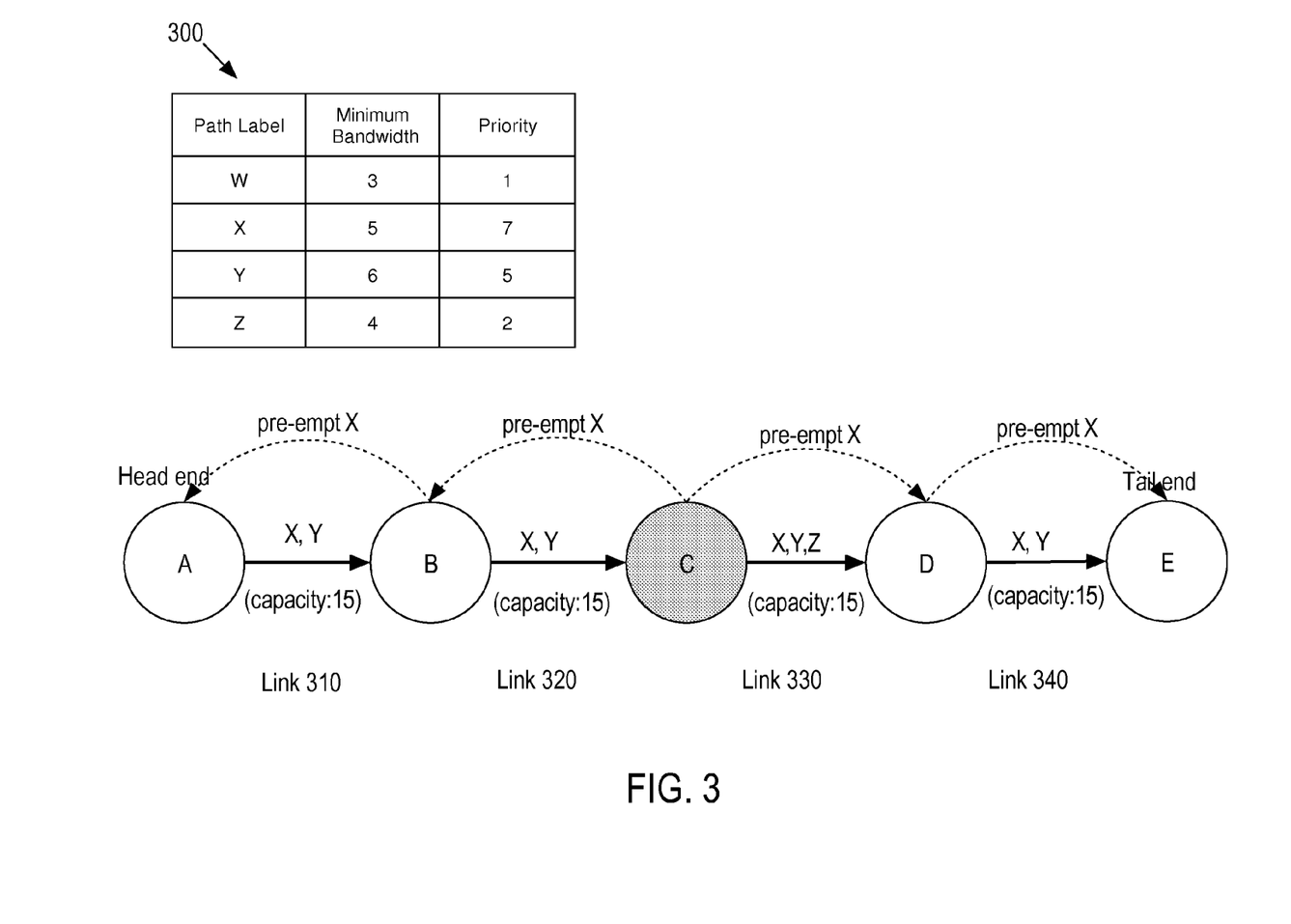
FIG. 3 illustrates using soft preemption to allocate bandwidth for a new, higher priority path.

3.0 Notifying Nodes on a Preempted Path of Preempted Bandwidth 3.1 First Example One Path Preempted FIG. 3 illustrates using soft preemption to allocate bandwidth for a new, higher priority path in the context of an example network comprising five (5) nodes.

FIG. 3 illustrates a hypothetical example network comprising five (5) nodes denoted A, B, C, D, E. Link 310 couples nodes A, B; link 320 couples nodes B, C; link 330 couples nodes C, D; link 340 couples nodes D, E. Numeric annotations such as "(capacity: 15)" indicate hypothetical units of bandwidth capacity for a link. The solid arrows pointing from left to right represent the downstream links over which traffic flows for a path. The dashed curved arrows pointing to the left in FIG. 3 represent the delivery of path error messages to upstream nodes, and the dashed curved arrows pointing to the right represent the delivery of path change messages to downstream nodes. Values X, Y, and Z denote example LSPs.

FIG. 3 illustrates an example path sequence comprising {Node A, Link 310, Node B, Link 320, Node C, Link 330, Node D, Link 340, Node E}. Two paths, represented by LSPs X and Y flow from Node A to Node E. An LSP label may be used herein as a shorthand expression meaning "the path represented by the LSP label." Thus all the links 310, 320, 330, and 340 reserve bandwidth for LSP X and LSP Y. Link 330, however, also has bandwidth reserved for another path LSP Z. In addition, the hypothetical capacity of all of the links 310 through 340 is 15 units/time.

Network elements such as nodes A, B, C, D, E may store one or more data tables that associate path labels, minimum bandwidth requested for an associated path, and priority values. Table 300 is an example association of path labels, minimum bandwidth, and priority. Each row of Table 300 contains information about a particular path including the LSP label, minimum bandwidth requirement, and priority value.

In an embodiment, the minimum bandwidth requirement for a path is the same for all links along the path. For example, all links that carry traffic for LSP Y have 5 units of bandwidth reserved, and the path has a priority value of 5. In an embodiment, the lower the priority value, the higher the priority. Thus, LSP W with a priority value of 1 has the highest priority of all the paths in Table 300.

For purposes of illustrating a clear example, FIG. 3 shows five (5) nodes and four (4) downstream links with particular example values for capacity and LSPs. In other embodiments, any number of nodes and links may be used.

Figure 4:
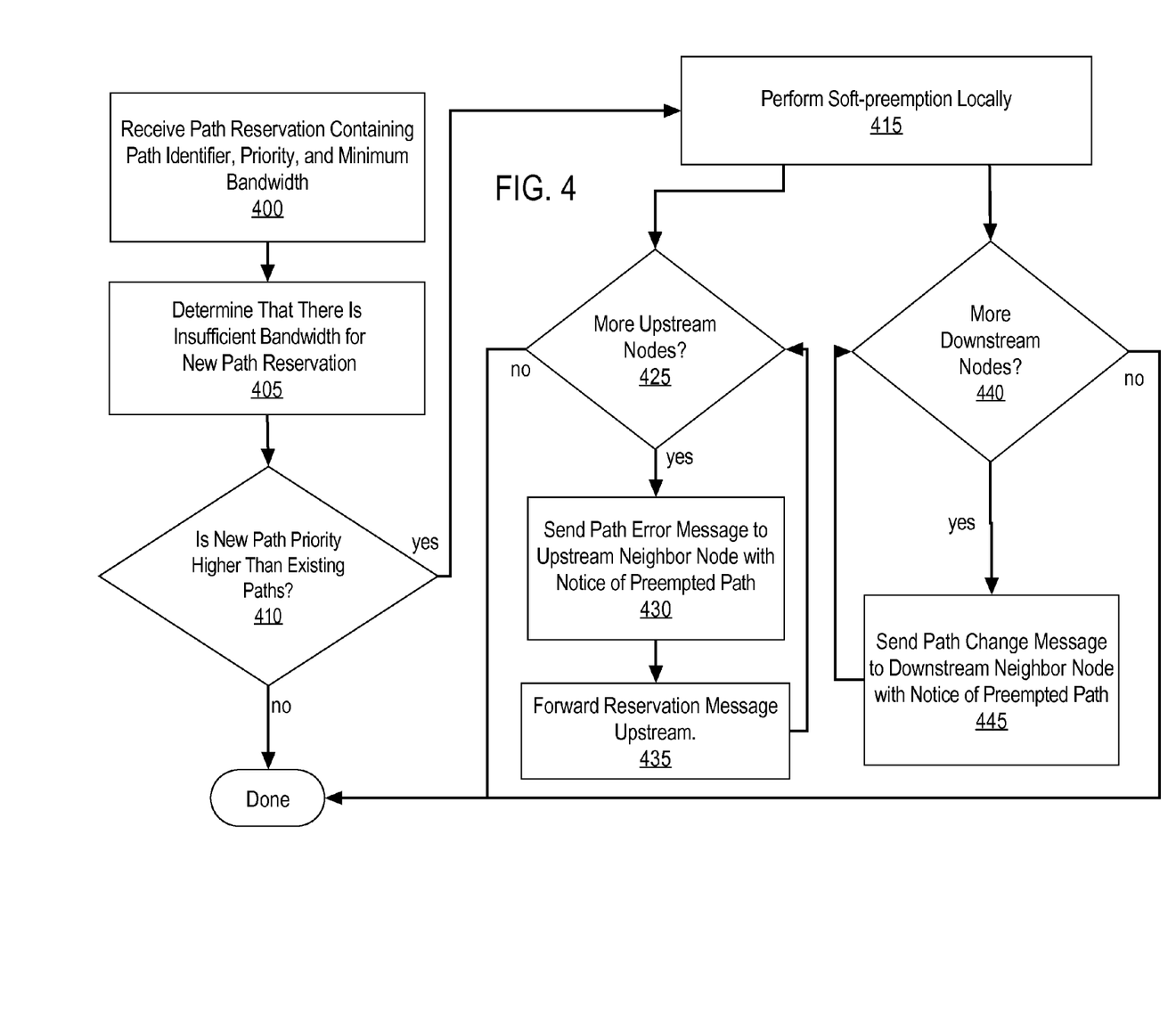
FIG. 4 illustrates a method for notifying upstream and downstream nodes of paths that have been soft preempted.

FIG. 4 illustrates a method for notifying upstream and downstream nodes of paths that have been soft preempted. The process illustrated in FIG. 4. is described herein with respect to the example in FIG. 3, particularly from the perspective of mid-point Node C. The process of FIG. 4 may be adapted in complementary ways to the position, link capacity, and LSPs associated with any of the nodes and links of FIG. 3 or any other network arrangement. Thus, the process of FIG. 4 is broadly applicable to any form of network arrangement and the particular context of FIG. 3 is not required.

The steps in FIG. 4 are performed in response to the head end signaling a new path that traverses the nodes A, B, C, D, and E and terminates at the tail end. The tail end sends a path reservation message for the newly signaled path. In Step 400, a network node receives a Path Reservation containing a path identifier, priority, and minimum bandwidth value. For example, in FIG. 3 Node C receives a path reservation message for LSP W with minimum bandwidth 3 and priority value 1.

In Step 405, the process determines that there is not sufficient bandwidth for the newly received path reservation. For example, Node C determines that there is not sufficient capacity on Link 330, the only downstream link from Node C, to reserve 3 units of bandwidth for LSP W without preempting an existing path. Bandwidth is already reserved on Link 330 for LSPs X, Y, and Z requiring bandwidth of 5, 6, and 4 respectively. The capacity of Link 330 is 15 units and the total bandwidth already reserved for LSPs X, Y, and Z is 15 units, so Link 330 has no spare capacity for another path.

In Step 420, the process tests whether the new path has a priority value that is higher than the priority associated with existing paths. For example, Node C determines whether LSP W has higher priority than LSPs X, Y, and Z that are currently reserved on the link. If the new path does not have a priority that is greater than any of the existing paths on the link, then the new path cannot be reserved on the link. However, in this example, the priority value for LSP W is 1, which is less than the priority values of 7, 5, and 2 for LSPs X, Y, and Z respectively. Thus, LSP W has higher priority than all of the paths currently reserved on Link 330. Node C may choose to soft-preempt any of the currently carried paths. In Step 415, the node performs soft preemption locally at the node. The details of performing soft preemption locally are described below with respect to FIG. 7. In this example, Node C chooses to soft-preempt LSP X. In Step 425, Node C tests to see whether there are any nodes upstream on the preempted path. If there are, then in Step 430 the current node sends the path error message to the upstream node. In this example, Node C sends a path error message upstream to Node B. After the path error message has been sent upstream, in Step 435, the reservation message is forwarded to upstream nodes. For example, Node C forwards the reservation path message to Node B. In the next iteration, Node B sends the path error message and the path reservation message to Node A.

In an embodiment, the soft preempting node starts a timer to wait for one or more RSVP reservation messages, which may be en route, to arrive and then performs the soft preemption process herein. In an embodiment, the upstream node receives and processes the path error message before processing the path reservation message, ensuring that the information about a soft-preempted path is available to the node for use when deciding how to allocate bandwidth for the new path requested in the path reservation message. Sequencing the messages in this way obviates the need for a timer. However, in an embodiment in which a network or vendor equipment is used where the order of messages is not guaranteed or in which additional time is needed, the timer logic may be used.

In Step 440, the process tests whether more downstream nodes are present in the path being soft-preempted. In an embodiment, if there is a downstream node, then in Step 445 the path change message is sent downstream. For example, Node C sends the path change message to Node D. In the next iteration, the path change message is sent from Node D to Node E. Message forwarding stops when there are no more nodes on the path. When finished, each of Nodes A, B, C, D, and E, has marked LSP X as having been soft-preempted.

Thus, in an embodiment, by keeping track of the LSPs that are in soft preemption pending state on downstream nodes on each upstream router and downstream routers respectively, the number of TE LSPs and amount of bandwidth that is preempted in a network can be minimized. Embodiments may implement the messaging described herein using an RSVP path message with a new session attribute flag 0x80 indicating soft preemption in-progress.

In an embodiment, before the head end receives the reservation message for the new, higher priority path, the head end receives path error messages from each of the set of preempting nodes and the corresponding paths that each node preempts. This allows the head end to exclude the list of preempting nodes when trying to compute a new path for each corresponding preempted path. The head end sends a path change message for the new, higher priority path. Thus, traffic for the soft-preempted paths may still be carried on the path, but the previously guaranteed bandwidth may no longer be guaranteed.

In an embodiment, the overall number of soft preemptions in a network are minimized, an outcome that is highly desired by network service providers for whom preemption can lead to excessive signaling and traffic congestion. The methods herein do not increase overall soft preemption duration and improve quality of service in a network. The methods herein may be readily implemented in software.

3.2 Performing Soft Preemption Locally at a Node

Figure 7:
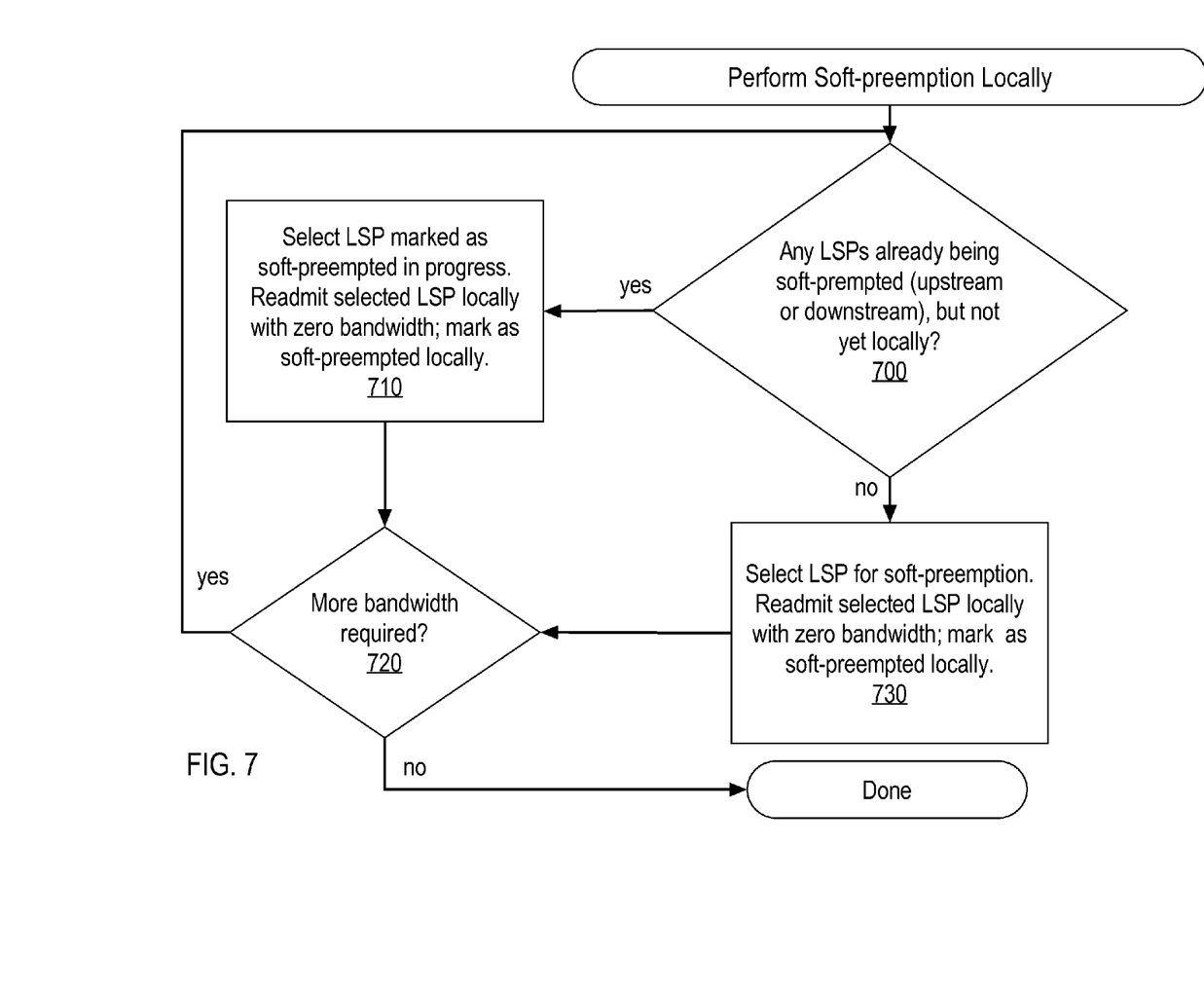
FIG. 7 illustrates a method for performing soft preemption locally within a node, according to an embodiment.

FIG. 7 illustrates a method for performing soft preemption locally within a node, according to an embodiment. The process starts in Step 700 that tests to see if any LSPs are already in a soft preemption-in-progress state from either an upstream or a downstream node, but has not yet been soft-preempted locally within the node. If there is at least one LSP in the process of soft preemption, then in Step 710, the node selects one of these LSPs, readmits the selected LSP with zero bandwidth, and marks the selected LSP as being soft-preempted locally within the node. In Step 720, the node tests to determine whether enough bandwidth has been freed or if more bandwidth is still needed. If no more bandwidth is needed, then the process is done. If more bandwidth is needed, then the process starts over at Step 700.

If in Step 700 there are no LSP's already in soft preemption-in-progress state that have not yet been marked locally by the node, then in Step 730, an LSP is selected for soft preemption that has not previously been soft-preempted by another node on its path. The node readmits the selected LSP locally with zero bandwidth and marks the LSP as soft-preempted locally. As before, in Step 720, the node tests to see if enough bandwidth has been freed or if more is still needed.

3.3 Second Example

Efficiency of Soft Preemption in Progress

The second example illustrates how the use of the soft preemption in progress technique described herein may reduce the number of paths that are preempted. Referring again to FIG. 1, a path shown in FIG. 1 is referred to in this example by the amount of reserved bandwidth for the path. For example, a path with 6 units of bandwidth reserved is referred to in this example as LSP 6. Although not explicitly depicted in FIG. 1, for purposes of example, Links 103 and 105 have no available bandwidth. Thus, if Node A sets up a new LSP 7 requiring 7 units of bandwidth to Node E, and the new LSP has a higher priority than the paths currently reserved on Links 105 and 103, soft pre-emption will be necessary on those links. In order to free 7 units of bandwidth, two paths will have to be preempted on each of Links 103 and 105. Without the use of soft preemption in progress messages, nodes D and C choose which paths to pre-empt independent of one another. Node D may select both paths currently reserved on Link 105 (LSP 5 and LSP 6), and Node C may select paths LSP 4 and LSP 5 carried over Link 103. As a result, three paths (LSP 4, LSP 5, and LSP 6) will be soft pre-empted to accommodate the admission of LSP 7. If nodes C and D were able to coordinate their selections of which paths to preempt, both Node C and D could have selected LSP 5 and LSP 6. As a result, only two paths would need to be preempted instead of three.

Figure 6:
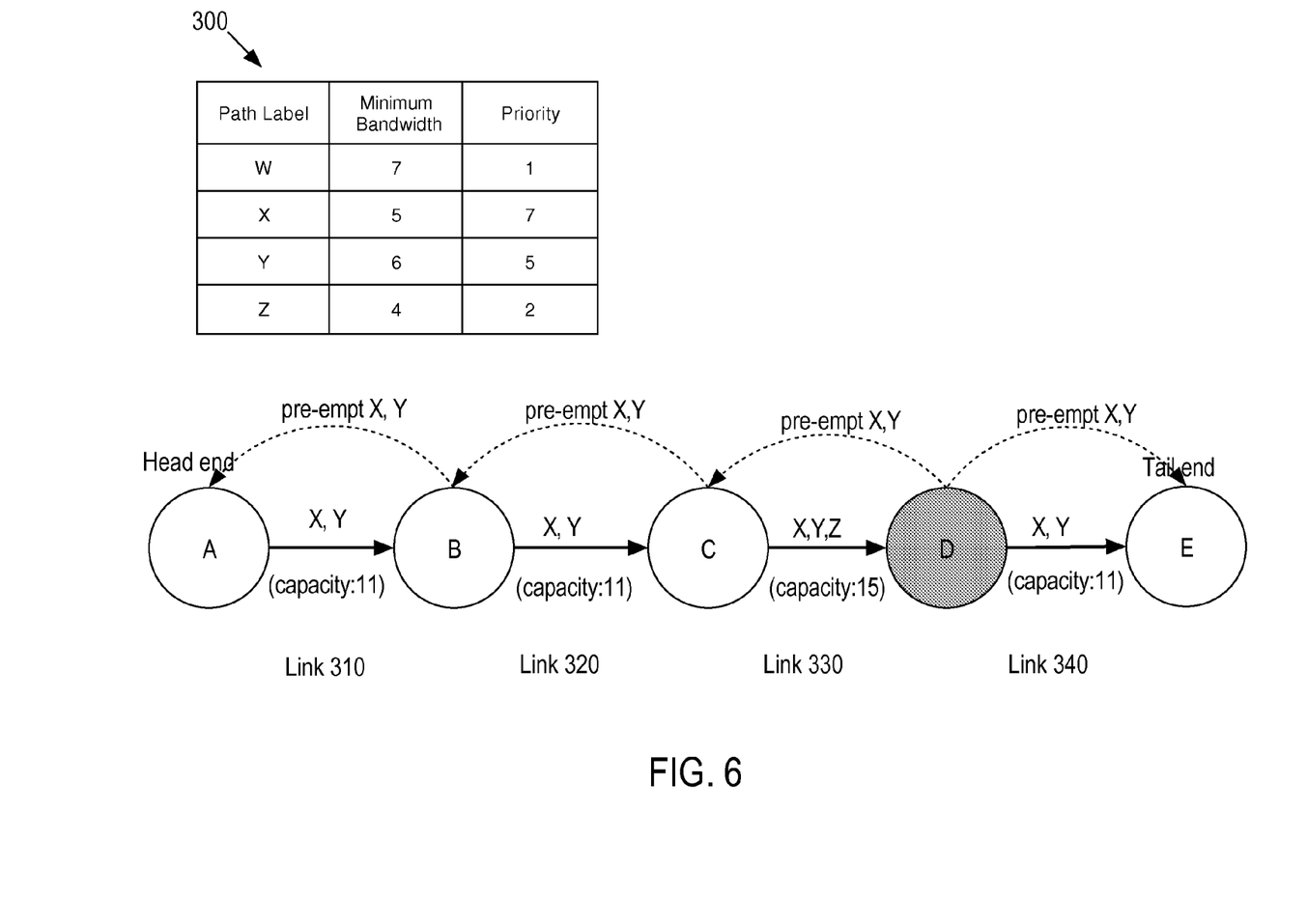
FIG. 6 illustrates using soft preemption to allocate bandwidth for a new, higher priority path in the context of an example network similar to the example shown in FIG. 3.

FIG. 6 illustrates using soft preemption to allocate bandwidth for a new, higher priority path in the context of an example network similar to the example shown in FIG. 3. The example illustrates how nodes can coordinate their soft preemption selections to minimize the number of paths that need to be preempted for the example illustrated in FIG. 1.

FIG. 6 illustrates another hypothetical example network comprising five (5) nodes denoted A, B, C, D, E. Link 310 couples nodes A, B; Link 320 couples nodes B, C; Link 330 couples nodes C, D; Link 340 couples nodes D, E. Numeric annotations such as "(capacity: 15)" indicate hypothetical units of bandwidth capacity for a link. The solid arrows pointing from left to right represent the downstream links over which traffic flows for a path. The dashed curved arrows pointing to the left in FIG. 6 represent the delivery of path error messages to upstream nodes, and the dashed curved arrows pointing to the right represent the delivery of path change messages to downstream nodes. Values X, Y, and Z denote example LSPs.

FIG. 6 illustrates an example path sequence comprising {Node A, Link 310, Node B, Link 320, Node C, Link 330, Node D, Link 340, Node E}. Two paths, represented by LSPs X and Y flow from Node A to Node E. Thus all the Links 310, 320, 330, and 340 reserve bandwidth for LSP X and LSP Y. Link 330, however, also has bandwidth reserved for another path LSP Z. In addition, reserved bandwidth on each Link 310 through 340 is equal to the hypothetical capacity of each link. The hypothetical capacity of Links 310, 320, and 340 is 11 units/time, and the hypothetical capacity of Link 330 is 15 units/time.

Network elements such as nodes A, B, C, D, E may store one or more data tables that associate path labels, minimum bandwidth requested for an associated path, and priority values. Table 300 is an example association of path labels, minimum bandwidth, and priority. Each row of Table 300 contains information about a particular path including the LSP label, minimum bandwidth requirement, and priority value. Similar to the example shown in FIG. 3, LSP W with a priority value of 1 has the highest priority of all the paths in Table 300.

For purposes of illustrating a clear example, FIG. 6 shows five (5) nodes and four (4) downstream links with particular example values for capacity and LSPs. In other embodiments, any number of nodes and links may be used.

FIG. 4 illustrates a method for notifying upstream and downstream nodes of paths that have been soft preempted. The process illustrated in FIG. 4. is described herein with respect to the example in FIG. 6, particularly from the perspective of mid-point Node D. The process of FIG. 4 may be adapted in complementary ways to the position, link capacity, and LSPs associated with any of the nodes and links of FIG. 6 or any other network arrangement. Thus, the process of FIG. 4 is broadly applicable to any form of network arrangement and the particular context of FIG. 6 is not required.

The steps in FIG. 4 are performed in response to the head end signaling a new path that traverses the nodes A, B, C, D, and E and terminates at the tail end. The tail end sends a path reservation message for the newly signaled path. In Step 400, a network node receives a Path Reservation containing a path identifier, priority, and minimum bandwidth value. For example, in FIG. 6 Node D receives a path reservation message for LSP W with minimum bandwidth 7 and priority value 1.

In Step 405, the process determines that there is not sufficient bandwidth for the newly received path reservation. For example, Node D determines that there is not sufficient capacity on Link 340, the only downstream link from Node D, to reserve 7 units of bandwidth for LSP W without preempting an existing path. Bandwidth is already reserved on Link 340 for LSPs X and LSP Y, requiring 5 and 6 units of bandwidth, respectively. The capacity of Link 340 is 11 units and the total bandwidth already reserved for LSPs X and Y is 11 units, so Link 340 does not have capacity to allocate another 7 units of bandwidth for LSP W. In Step 410, the process tests whether the new path has a priority value that is higher than the priority associated with existing paths. For example, Node D determines whether the new path, LSP W, has higher priority than existing paths currently reserved on the link. If the new path does not have a priority that is greater than any of the existing paths on the link, then the new path cannot be reserved on the link. However, in this example, the priority value for LSP W is 1, which is less than the priority values of 7 and 5 LSPs X and Y, respectively. Thus, LSP W has higher priority than all of the paths currently reserved on Link 340. Node D may choose to soft-preempt any of the currently carried paths. In addition, soft-preempting either reserved path on Link 340 would not provide enough freed bandwidth required to reserve for LSP W (requires 7 units), which means that Node D soft-preempts more than one path. In Step 415, Node D performs soft preemption locally. The details of performing soft preemption locally are described below with reference to FIG. 7. In this example, Node D selects LSP X and LSP Y for soft preemption.

In Step 425, if there is an upstream node on the preempted path, then in Step 430 the current node sends the path error message to the upstream node. In this example, Node D sends a path error message upstream to Node C. Receiving the path error message notifies Node C that LSP X and LSP Y are in the process of soft preemption, and in response, Node C marks LSP X and LSP Y locally within the node as being in a soft preemption-in-progress state.

After the path error message has been sent upstream, in Step 435, the reservation message is forwarded to upstream nodes. For example, Node D forwards the reservation path message to Node C. When Node C receives the reservation message, Node C determines that Link 330 is at capacity and cannot allocate another 7 units of bandwidth for LSP W without preempting one or more paths reserved on Link 330. Node C may check the paths carried on Link 330 to determine which, if any, are marked as soft pre-empted. Node C may choose a path that is marked as being soft-preempted before choosing a path that is not so marked. Thus, Node C may choose LSP X and LSP Y to soft-preempt because LSP X and LSP Y are both marked as soft-preempted, and their preemption would provide sufficient bandwidth for LSP W. Node C may not choose to preempt LSP Z because LSP Z is not already soft-preempted, and no additional bandwidth is needed to reserve bandwidth on Link 330 for LSP W. The path error message allows a downstream node to communicate which paths have already been soft-preempted so that those paths may be chosen before non-preempted paths by upstream nodes.

In the next iteration, Node C sends the path error message and the path reservation message to Node B, and Node B sends the path error message and the path reservation message to Node A.

In Step 440, the process tests whether more downstream nodes are present in the path. In an embodiment, if there is a downstream node, then in Step 445 the path change message is sent downstream. For example, Node D sends the path change message to Node E. Message forwarding stops when there are no more nodes on the path. When finished, each of Nodes A, B, C, D, and E, has marked LSP X and LSP Y as having been soft preempted. Thus, by using soft preemption in progress messages, nodes along a path can share information that can lead to preempting fewer paths.

3.4 Responding to a Path Error Message

Figure 8:
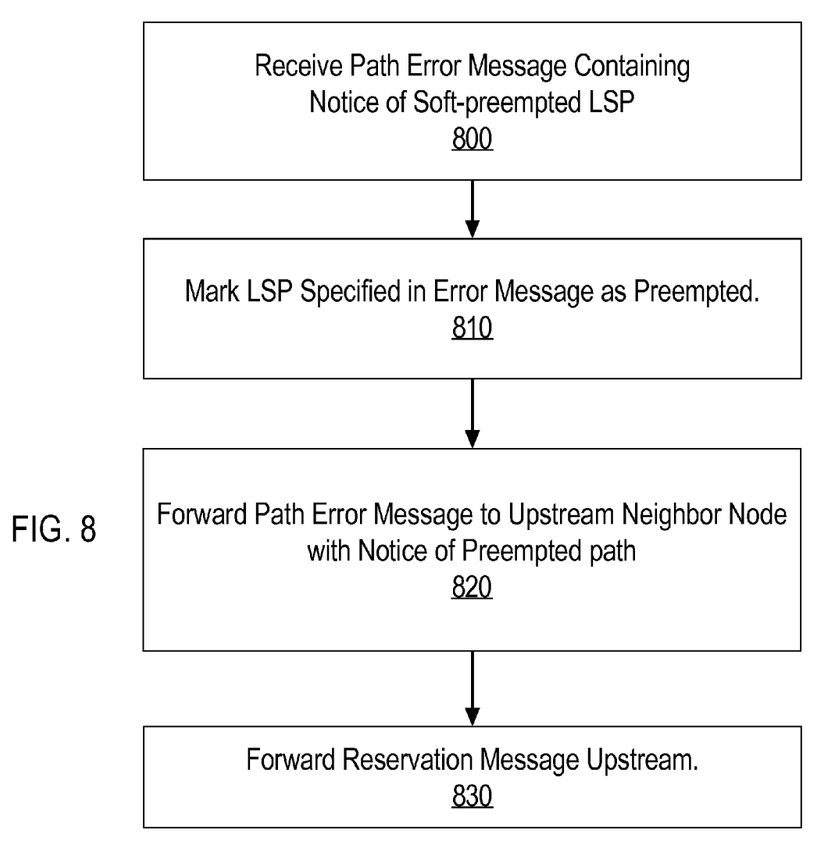
FIG. 8 illustrates a method for receiving and responding to a path error message that that contains a notice of soft preemption in progress, according to an embodiment.

FIG. 8 illustrates a method for receiving and responding to a path error message that that contains a notice of soft preemption in progress, according to an embodiment. A node receives a path error message from a downstream node in Step 800. The path error message contains information about one or more LSP(s) that are in the process of being soft-preempted by a downstream node. In Step 810 the node marks the specified LSP(s) as being in the process of soft preemption. In Step 820, the node forwards the path error message to the upstream node along the path of the LSP. Only after the path error message has been forwarded, the reservation message is forwarded upstream in Step 830. Performing Step 820 before Step 830 allows the receiving node to note LSP(s) that have already been selected for soft preemption before the node must make a choice of which paths to soft-preempt to accommodate the reservation request.

3.5 Responding to a Path Change Message

Figure 9:
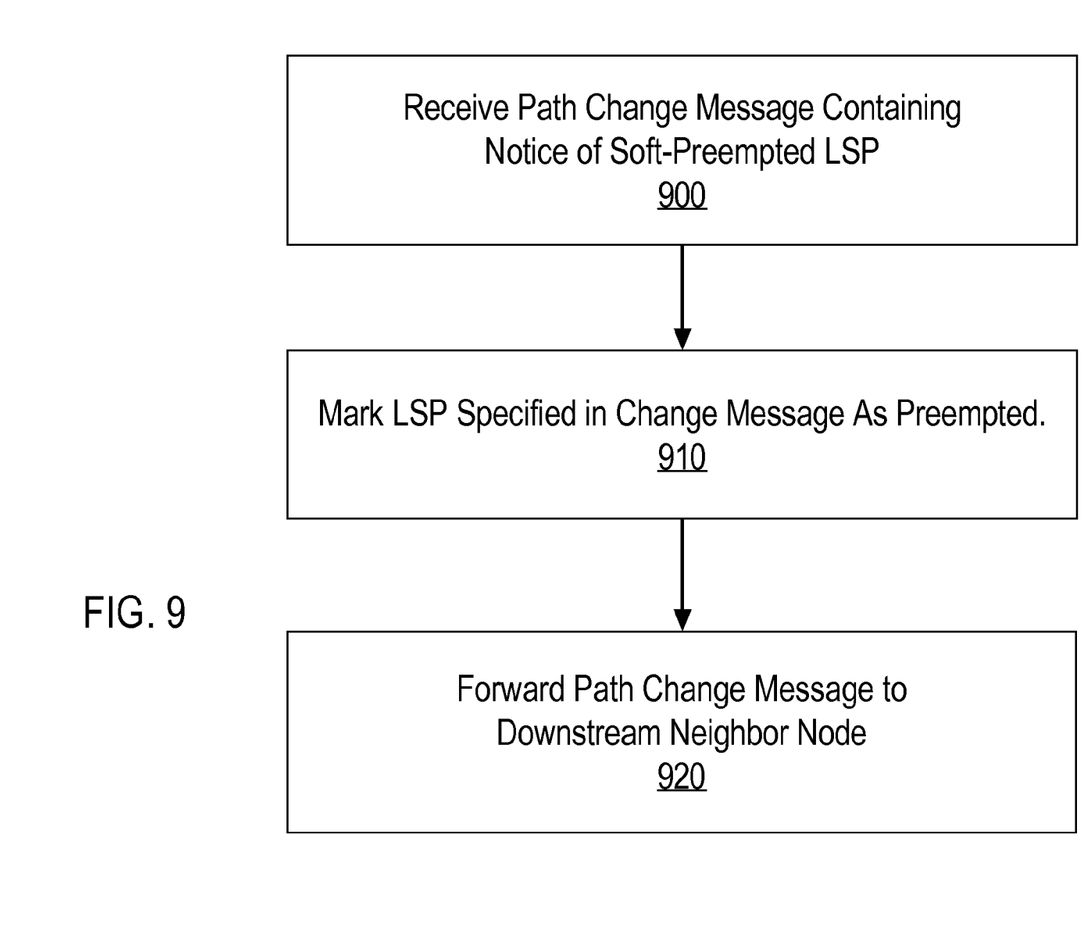
FIG. 9 illustrates a method for receiving and responding to a path change message that contains a notice of soft preemption in progress, according to an embodiment.

FIG. 9 illustrates a method for receiving and responding to a path change message that contains a notice of soft preemption in progress, according to an embodiment. In Step 900, a node receives a path change message from an upstream node. The path change message contains information about one or more LSP(s) that are in the process of being soft-preempted by an upstream node. In Step 910, the node marks the specified LSP(s) as being in a soft preemption-in-progress state. In Step 920, the node forwards the path change message to the downstream node along the path of the soft-preempted LSP.

A nodes that is downstream of a node preempting a path may receive the path change message after the node has already processed the path reservation message. However, the next time the node needs to select a path for soft preemption. Selecting a path that has previously been preempted instead of selecting a path that has not previously been soft-preempted may still result in fewer overall preemptions.

In an embodiment, the overall number of preemptions in a network are minimized, an outcome that is highly desired by network service providers for whom preemption can lead to excessive signaling and traffic congestion. The methods herein do not increase overall soft preemption duration and improve quality of service in a network. The methods herein may be readily implemented in software.

4.0 Implementation Mechanisms—Hardware Overview

Figure 5:
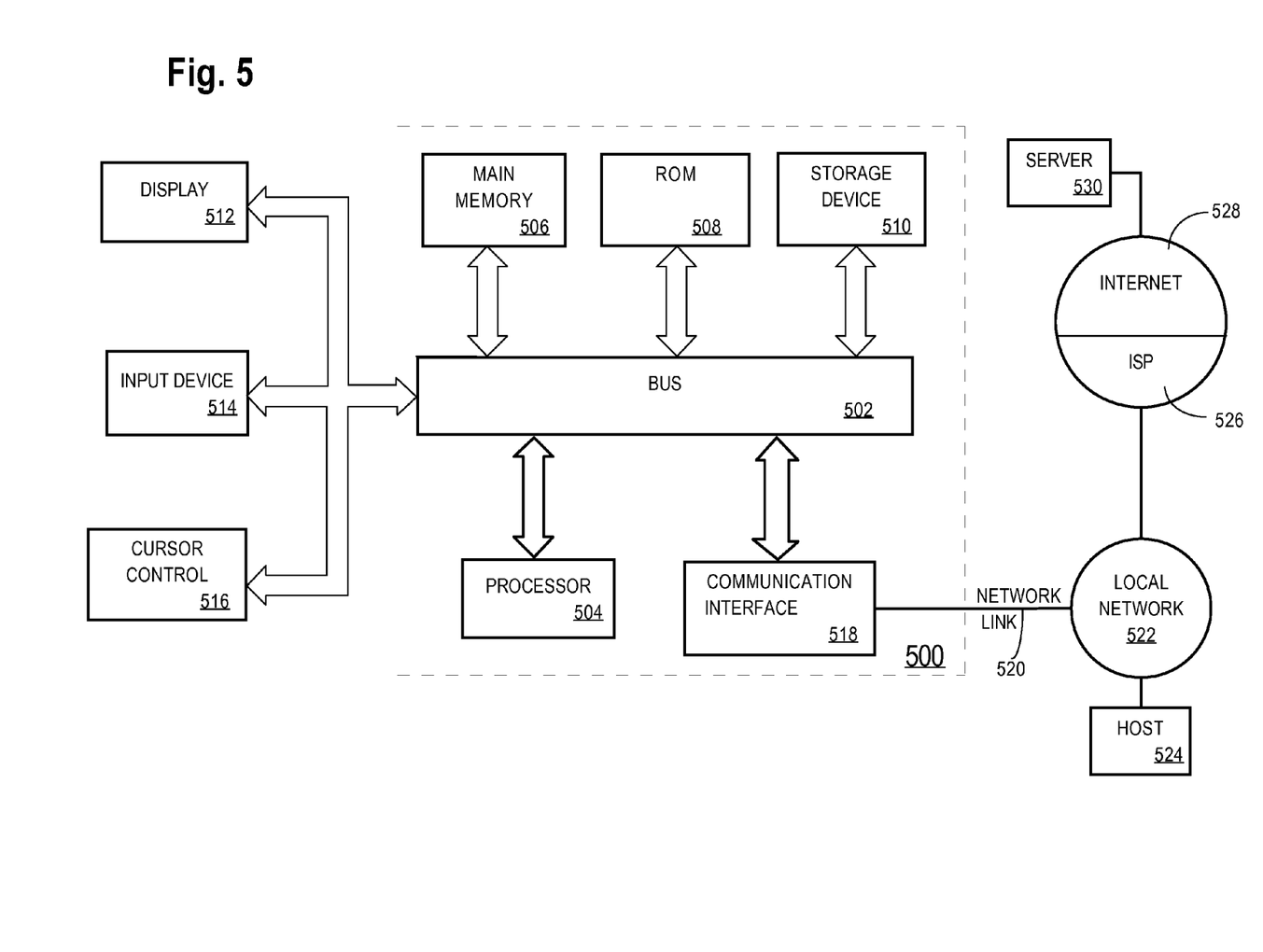
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

In an embodiment, the soft preemption technique may be enhanced to handle multiple soft preemptions due to multiple high priority paths being set up in a network. Referring to the example in FIG. 3, if a second high priority path, LSP V, is set up within a certain amount of time as LSP W, Node E for example, may receive reservation messages for LSP W and LSP V within a certain small amount of time. Node E may store information that indicates that multiple new paths are being setup. When Node E receives the path message for LSP W, based on the stored information, Node E may wait until the path message for LSP V is also received before starting the soft preemption process for LSP W. Thus, combined soft preemption in response to setting up paths for both LSP V and LSP W may be performed at the same time. The path error messages for all resulting soft preemptions may be sent to Node D before the path reservation messages for LSP V and LSP W are propagated.

What is claimed is:

1. A method, comprising:
   receiving, at a first network node, a resource reservation message specifying a first label switched path (LSP), a first priority value, and a first minimum required bandwidth value associated with the first LSP;
   determining, at the first network node, that a sum of the first minimum required bandwidth value and a second minimum required bandwidth associated with a previously received, second LSP exceeds an available bandwidth of a first link of the first network node to a second network node;
   determining whether the first priority value indicates that the first LSP has a higher priority than the second LSP;
   in response to determining that the first LSP has a higher priority than the second LSP, marking the second LSP as soft-preempted and ineligible to reserve bandwidth;
   sending an error message to a third network node specifying that the second LSP is soft-preempted at the first link of the first node, wherein the third network node is upstream of the first network node, and wherein the third network node is not an origin of the second LSP.

2. The method of claim 1, further comprising the third network node marking the second LSP as soft-preempted.

3. The method of claim 1, further comprising sending a message to a fourth network node specifying that the second LSP is soft-preempted, wherein the fourth network node is downstream of the first network node.

4. The method of claim 3, further comprising the fourth network node marking the second LSP as soft-preempted.

5. The method of claim 4, further comprising:
   in response to receiving at the fourth network node, the resource reservation message specifying a fourth LSP, a fourth priority value, and a fourth minimum required bandwidth value associated with the fourth LSP, determining whether any LSP, of a set of LSPs for which traffic is carried over the fourth link, must be preempted;
   in response to determining that at least one LSP that is carried over the second link must be soft-preempted, selecting a fifth LSP for soft preemption, wherein the fifth LSP is one of the second LSP or another LSP that is already marked for soft preemption;
   sending an error message to a second network node specifying that the fifth LSP is soft-preempted, wherein the second network node is upstream of the fourth network node.

6. The method of claim 3 wherein the message to the fourth network node is an RSVP new path change message.

7. The method of claim 1, further comprising determining whether any LSP, of one or more LSPs previously assigned to the first link, must be soft-preempted by determining that a sum of the first minimum required bandwidth value and each minimum required bandwidth value associated with each LSP of the one or more LSPs previously assigned to the first link exceeds the available bandwidth of the first link of the first network node to the second network node.

8. The method of claim 7, wherein determining whether an LSP, of the one or more LSPs previously assigned to the first link, must be soft-preempted comprises determining that the first LSP has higher priority than at least one of the LSPs.

9. The method of claim 1, wherein the first LSP has higher priority than the second LSP when the first priority value is less than a second priority value associated with the second LSP, and the first LSP has lower priority than the second LSP when the first priority value is greater than the second priority value.

10. The method of claim 1, further comprising:
    the third network node receiving the error message specifying that the second LSP is soft-preempted, wherein the third network node sends traffic for the second LSP over a second link;
    the third network node marking the second LSP as being soft-preempted by a downstream node;

in response to receiving at the third network node, the resource reservation message specifying a first LSP, the first priority value, and the first minimum required bandwidth value associated with the first LSP, determining whether any LSP, of a set of LSPs for which traffic is carried over the second link, must be soft-preempted;

the third network node forwarding the path error message upstream;

in response to determining that at least one LSP that is carried over the second link must be preempted, selecting a third LSP for soft preemption, wherein the third LSP is one of the second LSP or another LSP that is already marked for soft preemption;

sending an error message to a fifth network node specifying that the third LSP is soft-preempted, wherein the fifth network node is upstream of the third network node.

11. The method of claim 1 wherein each of the messages conforms to resource reservation protocol (RSVP).

12. An apparatus, comprising:
a network interface that is coupled to the data network for receiving one or more packet flows therefrom;
a processor;
a memory coupled to the processor and storing one or more stored sequences of instructions which, when executed by the processor, cause the processor to perform:
receiving, at a first network node, a resource reservation message specifying a first label switched path (LSP), a first priority value, and a first minimum required bandwidth value associated with the first LSP;
determining, at the first network node, that a sum of the first minimum required bandwidth value and a second minimum required bandwidth associated with a previously received, second LSP exceeds an available bandwidth of a first link of the first network node to a second network node;
determining whether the first priority value indicates that the first LSP has a higher priority than the second LSP;
in response to determining that the first LSP has a higher priority than the second LSP, marking the second LSP as soft-preempted and ineligible to reserve bandwidth for the second LSP;
sending an error message to a third network node specifying that the second LSP is soft-preempted, wherein the third network node is upstream of the first network node, and wherein the third network node is not an origin of the second LSP.

13. The apparatus of claim 12, further comprising sequences of instructions which, when executed by the processor, cause the processor to perform:
sending a message to a fourth network node specifying that the second LSP is soft-preempted, wherein the fourth network node is downstream of the first network node.

14. The apparatus of claim 12, further comprising sequences of instructions which, when executed by the processor, cause the processor to perform:
determining whether any LSP, of one or more LSPs previously assigned to the first link, must be preempted by determining that a sum of the first minimum required bandwidth value and each minimum required bandwidth value associated with each LSP of the one or more LSPs previously assigned to the first link exceeds the available bandwidth of the first link of the first network node to the second network node.

15. The apparatus of claims 14, wherein the instructions that cause determining whether an LSP, of the one or more LSPs previously assigned to the first link, must be preempted further comprise instructions which when executed cause determining that the first LSP has higher priority than at least one of the LSPs.

16. The apparatus of claims 12, further comprising sequences of instructions which, when executed by the processor, cause the processor to perform:
the third network node receiving the error message specifying that the second LSP is soft-preempted, wherein the third network node sends traffic for the second LSP over a second link;
the third network node marking the second LSP as being soft-preempted by a downstream node;
in response to receiving at the third network node, the resource reservation message specifying a first LSP, the first priority value, and the first minimum required bandwidth value associated with the first LSP, determining whether any LSP, of a set of LSPs for which traffic is carried over the second link, must be soft-preempted;
the third network node forwarding the path error message upstream;
in response to determining that at least one LSP that is carried over the second link must be preempted, selecting a third LSP for soft preemption, wherein the third LSP is one of the second LSP or another LSP that is already marked for soft preemption;
sending an error message to a fifth network node specifying that the third LSP is soft-preempted, wherein the fifth network node is upstream of the third network node.

17. A non-transitory computer-readable storage medium storing one or more sequences of instructions, which when executed cause one or more processors to perform:
receiving, at a first network node, a resource reservation message specifying a first label switched path (LSP), a first priority value, and a first minimum required bandwidth value associated with the first LSP;
determining, at the first network node, that a sum of the first minimum required bandwidth value and a second minimum required bandwidth associated with a previously received, second LSP exceeds an available bandwidth of a first link of the first network node to a second network node;
determining whether the first priority value indicates that the first LSP has a higher priority than the second LSP;
in response to determining that the first LSP has a higher priority than the second LSP, marking the second LSP as soft-preempted and ineligible to reserve bandwidth;
sending an error message to a third network node specifying that the second LSP is soft-preempted, wherein the third network node is upstream of the first network node, and wherein the third network node is not an origin of the second LSP.

18. The non-transitory computer-readable storage medium of claim 17, further comprising instructions, which when executed, cause the one or more processors to perform:
sending a message to a fourth network node specifying that the second LSP is soft-preempted, wherein the fourth network node is downstream of the first network node.

19. The non-transitory computer-readable storage medium of claim 17, further comprising instructions, which when executed, cause the one or more processors to perform:
determining whether any LSP, of one or more LSPs previously assigned to the first link, must be preempted by determining that a sum of the first minimum required bandwidth value and each minimum required bandwidth value associated with each LSP of the one or more LSPs previously assigned to the first link exceeds the available bandwidth of the first link of the first network node to the second network node.

20. The non-transitory computer-readable storage medium of claim 19, wherein determining whether an LSP, of the one or more LSPs previously assigned to the first link, must be preempted comprises determining that the first LSP has higher priority than at least one of the LSPs.

21. The non-transitory computer-readable storage medium of claim 17, further comprising instructions, which when executed, cause the one or more processors to perform:
the third network node receiving the error message specifying that the second LSP is soft-preempted, wherein the third network node sends traffic for the second LSP over a second link;
the third network node marking the second LSP as soft-preempted;
in response to receiving at the third network node, the resource reservation message specifying a first LSP, the first priority value, and the first minimum required bandwidth value associated with the first LSP, determining whether any LSP, of a set of LSPs for which traffic is carried over the second link, must be preempted;
in response to determining that at least one LSP that is carried over the second link must be preempted, selecting a third LSP for soft preemption, wherein the third LSP is one of the second LSP or another LSP that is already marked for soft preemption;
sending an error message to a fifth network node specifying that the third LSP is soft-preempted, wherein the fifth network node is upstream of the third network node;
forwarding the error message specifying that the second LSP is soft-preempted to the fifth network node.

* * * * *